No. 626,307. Patented June 6, 1899.
J. SHEPPARD & F. DASHWOOD.
BRICK, TILE, &c., AND CONSTRUCTION OF WALLS, &c.
(Application filed Feb. 23, 1898.)

(No Model.)

WITNESSES:
John Buckler,
L. M. Muller

INVENTORS
James Sheppard and
Frederick Dashwood,
BY
Edgar Tate & Co.
ATTORNEYS

UNITED STATES PATENT OFFICE.

JAMES SHEPPARD AND FREDERICK DASHWOOD, OF LONDON, ENGLAND.

BRICK, TILE, &c., AND CONSTRUCTION OF WALLS, &c.

SPECIFICATION forming part of Letters Patent No. 626,307, dated June 6, 1899.

Application filed February 23, 1898. Serial No. 671,373. (No model.)

*To all whom it may concern:*

Be it known that we, JAMES SHEPPARD and FREDERICK DASHWOOD, subjects of the Queen of Great Britain, residing at London, in the county of Middlesex, England, have invented certain new and useful Improvements in Bricks, Tiles, and the Construction of Walls and the Like, of which the following is a full and complete specification, such as will enable those skilled in the art to which it appertains to make and use the same.

This invention relates to improvements in the form of bricks or tiles to be used in the construction of walls, partitions, and other structures, the object being to furnish a brick or tile having certain structural characteristics providing for an increased strength in building and a reduction of the cost of manufacture.

The invention is fully disclosed in the following specification, of which the accompanying drawings form a part, in which the separate parts of our improvement are designated by the same numerals of reference in each of the views, and in which—

Figure 1:
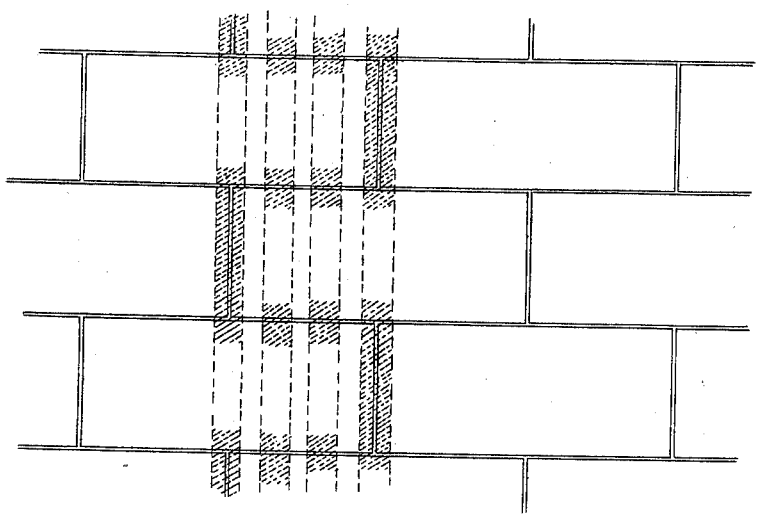
Figure 2:
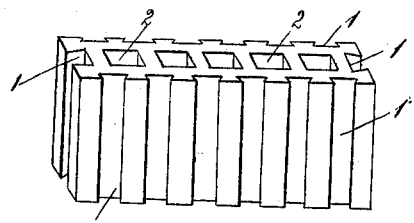
Figure 3:
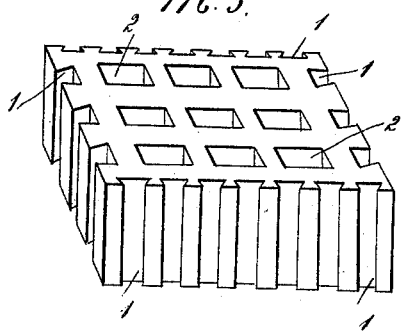

Figure 1 is a side elevation of a portion of a wall or partition built of tiles constructed in accordance with this invention. Fig. 2 is a perspective view of a tile constructed in accordance with this invention and when used in building a thin wall, and Fig. 3 is a perspective view of a wider tile.

The improvement in the form of and mode of building with the bricks or tiles consists in molding channels 1 on their sides as well as on their ends when they are to be used in structures having a thickness equal to that of two or more of the bricks or tiles, the divisions between all such channels being slightly increased from their roots to their outer edges, so as to secure a dovetailed outline or plan.

The hollow spaces or passages 2 through the bricks or tiles with the channel on their ends and sides are varied to suit the different structures for which the bricks or tiles may be intended, the form and area of these hollow spaces and channel being proportioned so as to secure, when built together, a strength at the doweled beds and keyed joints equal to that of other parts of the structure.

When building with these bricks or tiles, the usual lime or cement mortar is applied in the following manner: A layer of mortar is placed on the horizontal joint or bed of the bricks or tiles and also on the channels on their ends and on their sides when used in structures exceeding one brick or tile in thickness. These layers of mortar are firmly pressed into position as the bricks or tiles are built together, so as to form dowels and keys of mortar in all beds and joints, respectively. A concrete filling is used for the vertical joints at the ends and sides of the bricks or tiles in place of mortar.

The improvement in setting these and similar bricks or tiles in hacks for drying immediately after they are molded consists in using corrugated and pierced pallets formed in any suitable material arranged so as to allow free circulation of air. These pallets are placed between the bricks or tiles horizontally or vertically and remain in such position until the bricks or tiles are dry and hard, the whole hack being firmly stacked together to prevent the bricks or tiles warping or twisting during drying.

Having fully described our invention, we claim as new and desire to secure by Letters Patent—

The herein-described bricks or tiles for use in the construction of thin partitions and the like, said bricks or tiles being provided on their sides and ends with dovetail grooves, and said bricks or tiles being also provided with vertical spaces or channels which pass entirely therethrough as and for the purpose set forth.

In testimony that we claim the foregoing as our invention we have signed our names, in presence of the subscribing witnesses, this 1st day of February, 1898.

JAMES SHEPPARD.
FREDERICK DASHWOOD.

Witnesses:
PERCY E. MATTOCKS,
WM. O. BROWN.